Feb. 11, 1969  E. HENRY-BIABAUD  3,426,612
SERVO-STEERING SYSTEMS FOR AUTOMOBILE VEHICLES
Original Filed Oct. 22, 1965
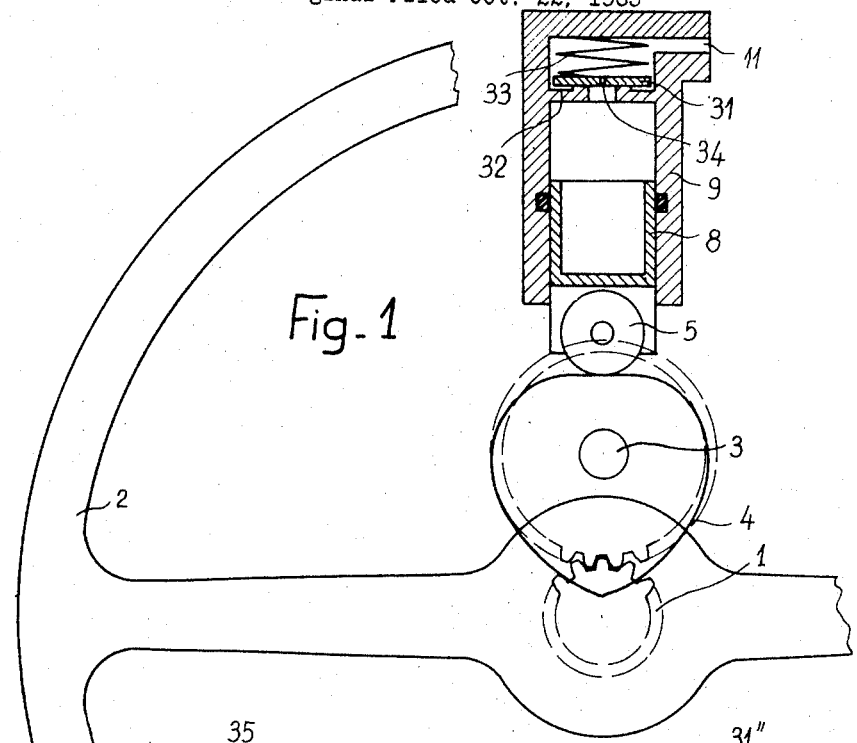
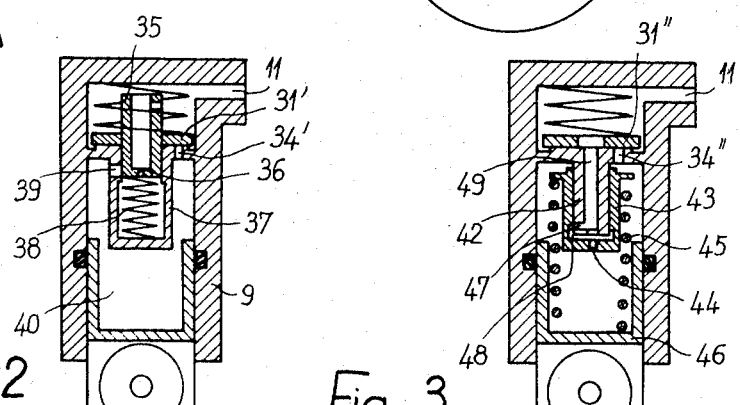
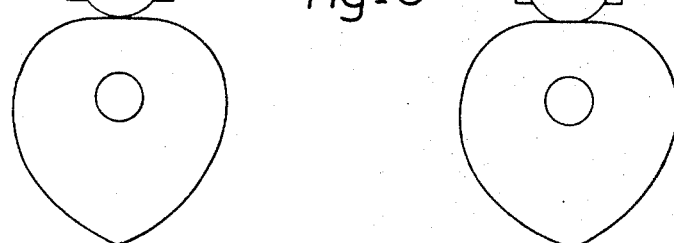
EDMOND HENRY-BIABAUD.
INVENTOR
By: Wenderoth, Lind & Ponack.
Atty's

United States Patent Office 3,426,612
Patented Feb. 11, 1969

3,426,612
SERVO-STEERING SYSTEMS FOR AUTOMOBILE VEHICLES
Edmond Henry-Biabaud, Paris, France, assignor to Société Anonyme André Citroen, Paris, France
Original application Oct. 22, 1965, Ser. No. 501,377, now Patent No. 3,373,631, dated Mar. 19, 1968. Divided and this application Nov. 16, 1967, Ser. No. 683,529
Claims priority, application France, Mar. 16, 1965, 9,475
U.S. Cl. 74—495        4 Claims
Int. Cl. B62d 1/16, 5/08

ABSTRACT OF THE DISCLOSURE

A steering arrangement for an automotive vehicle comprising a steering shaft rotatably mounted upon the vehicle. A steering wheel is fixed to said shaft for rotating said shaft. A second shaft is rotatably mounted upon the vehicle extending parallel to the steering shaft having a cam thereon. Means are operatively connected to both said shafts for rotating said second shaft and said cam by the steering shaft at reduced speed. A thrust piston frictionally engages the cam and such piston is disposed in a cyclinder receiving a variable pressure fluid from a supply system to exert a resistance against rotation of the cam. A valve cooperates with a seat disposed inside the cylinder to open only in the direction of return whereby fluid may return to the supply system and a system comprising a sliding valve and a calibrated orifice is disposed through the seat of the first valve to regulate the action of the pressure during the return of the steering column, whatever the value of this pressure may be.

---

This is a divisional application of my co-pending applicaton Ser. No. 501,377 of Oct. 22, 1965, now Patent No. 3,373,631.

In the previous United States Patent No. 3,171,298 in the name of Mr. E. Henry-Biabaud and assigned to the Société Anonyme André Citroen, there has been described an improvement in servo-steering devices for automobile vehicles, consisting of associating with the steering column or shaft operating the servo-control device, another device adapted to apply to the said column a resistance proportional to the steering angle and preferably also proportional to the speed of the vehicle. In one preferred form of embodiment, this device comprises a cam coupled for rotation with the said steering column, on which is supported a roller urged by a variable-pressure pneumatic or hydraulic device.

It has proved however that a device of this kind could come into action in an untimely manner during the return of the steering column to the straight-line position.

In fact, the pressure applied behind the roller then tends to accelerate the return movement of the steering mechanism and to result in an overrunning of the neutral position (or straight-line position) or, if the driver has difficulty in braking the steering wheel, there may result a certain inaccuracy of manoeuvering with a more or less abrupt stoppage of this latter, and this gives rise to unpleasant transverse acceleration after manoeuvers with large steering angles such as take place during parking, traffic in towns or in mountain districts.

The invention is directed to an improved arrangement of the device of the kind specified above, permitting the pressure to act freely during turning, that is to say to develop a resistance which increases with the steering angle, but which opposes the effect of the pressure or which only permits a reduced pressure to be applied during the return movement of the steering, that is to say during the return to a straight line.

To this end, there is provided in the hydraulic circuit acting on the roller a clapper-valve which is inoperative during steering, but which opposes any rapid return of the liquid during the straightening out operation.

Different forms of construction of a device in accordance with the present invention will now be described by way of example, reference being made to the accompanying drawings, in which:

FIG. 1 is a diagrammatic view of a first form of embodiment;

FIG. 2 is a diagrammatic view of a second form of embodiment;

FIG. 3 is a diagrammatic view of a third form of embodiment.

In FIG. 1, there has been shown a part of the device shown in FIG. 1 of the previous patent, but to which has been added the device of the present invention.

It will be recalled that with the steering column 1, actuated by means of the steering wheel 2, there is associated a pair of pinions for driving a cam 4 in rotation about a shaft 3; on this cam presses a roller 5 which is subjected to the thrust of a hydraulic circuit, the cam having a shape such that the turning of the steering wheel produces a thrust on the roller and in consequence, a reaction on the hydraulic circuit, such as, in the example shown, the driving of the piston 8 inside the cylinder 9, connected by a conduit 11 to a source of pressure (not shown). In order to prevent, during the return of the steering towards the straight-line position, the pressure of the circuit from applying, through the intermediary of the roller and the cam, a force on the steering column tending to bring it back abruptly into the said straight-line position while accelerating its movement, there is provided according to the invention, inside the cylinder 9, a clapper-valve 31 applied against its seating 32 by a spring 33 and which opposes the passage of the liquid coming from the conduit 11 to the interior of the cylinder 9. An orifice 34 permits however the passage of a limited flow to the cylinder 9; in this way, during turning, the liquid under pressure contained in the cylinder 9 can flow-back freely under the effect of the inward movement of the piston 9, towards the conduit 11.

On the other hand, during the return of the steering column to its straight-line position, the shape of the cam permits forward movement of the piston 8, but it is necessary to brake the thrust resulting on the cam, and in consequence on the column, because of the pressure of the liquid. It can be seen that at this moment, the clapper-valve 31 is applied against its seating and that the orifice 34 (or a series of orifices) creates a drop in pressure which slows-down the flow and which limits the outward speed of the piston 8, thus reducing or even annulling the action of the device on the cam.

However, with a device of this kind, if the pressure of the liquid is an increasing function of the speed of the vehicle, the effectiveness obtained tends to be too great at low speeds and too small at high speeds.

The devices shown in FIGS. 2 and 3 permit this disadvantage to be obviated. In the device shown in FIG. 2, there is associated with the clapper-valve 31' bearing on the seating 32' provided with an orifice 34', a slide-valve 35 comprising a calibrated orifice 36 and sliding in a fixed sleeve 37 having an orifice 39. This slide-valve is urged by a spring 38 so that beyond a given pressure drop, the orifice 39 becomes closed. It is seen that if the pressure in the conduit 11 (irrespective of its value) is preponderant with respect to the pressure in the cylinder 9, with a difference at least equal to the drop in pressure the flow which supplies the chamber 40 is constant and the operation is identical with that of a flow regulator of known type.

It will be understood that when the drop in pressure determined by the spring 38 is reached, the slide-valve 35 cannot advance beyond the orifice 39, since it would tend to compress the liquid enclosed in the interior chamber of the sleeve 37; as the pressure then becomes balanced, the slide-valve tends to move-up under the effect of the spring 38, so that the flow is limited in value, whatever the pressure may be. In this way, the return of the steering is independent of the incoming pressure 11 and is therefore independent of the speed of the vehicle and is constant, irrespective of the angular position of the steering wheel if the restoring torque due to the shape of the cam is constant.

The third device shown in FIG. 3 comprises, in addition to the clapper-valve 31″ and the orifice 34″, a fixed-slide-valve 42, on which slides a sleeve 43 provided with a calibrated hole 44. A spring 45 is supported on one side of the sleeve 43 and on the other on the cam-piston 46; a baffle 47–48 is formed between the slide-valve and the sleeve in such manner that the liquid coming from the conduit 11 and passing through the central recess 49, can only reach the orifice 44 when the sleeve is completely forced-in over the slide-valve.

It can be seen that this spring is compressed to the maximum when the wheels are at their turning limit, and to the minimum in the straight-line position. Thus, when the steering column is brought back in the straight-line direction, the spring 45 expands and it establishes a difference in pressure between the chamber 49 and the conduit 11, until this difference reaches the value of the pressure-drop due to the orifice 44.

At this moment, the sleeve 43 moves forward by sliding and the passage 47–48 closes. The forward movement of the piston 46 then only depends on the strength of the spring 45. Thus, the slowing-down of the flow is independent of the incoming pressure and therefore of the speed of the vehicle and on the contrary depends on the angular position of the steering wheel, since the force of the spring, falling during the return movement, causes a reduction of the flow which may become completely annulled if the spring is wholly expanded, which resolves more completely the problem set.

It will be noted that in the last two devices, there may be added at will to the constant flow a leakage proportional to the incoming pressure, and this can be effected by increasing the clearance between the slide-valve 35 or 42 and the sleeve 37 or 43.

What I claim is:

1. A steering arrangement for an automotive vehicle comprising a fluid supply system, a steering shaft rotatably mounted upon said vehicle movable from a neutral position when the vehicle moves in a straight line to a position at an angle thereto, a steering wheel fixed to said shaft for manually rotating said steering shaft, a second shaft rotatably mounted upon said vehicle extending parallel to said steering shaft, a cam fixed to said second shaft, means operatively connected to said first shaft and said second shaft for rotating said second shaft and said cam by said steering shaft at reduced speed, a cylinder receiving a variable pressure fluid from said supply system, a thrust piston mounted in said cylinder frictionally engaging said cam to exert a resistance against rotation of said cam, a valve seat inside said cylinder, a valve cooperating with said seat which opens under the action of said piston to allow said pressure fluid in said cylinder to return to said supply system, and an auxiliary valve by which the fluid enters into said cylinder, said auxiliary valve comprising a sleeve and a slide-valve, each having an orifice and one of said two orifices being calibrated, said auxiliary valve allowing a controlled flow of said fluid to enter said cylinder during the return movement of said steering shaft to said neutral position.

2. A steering arrangement as claimed in claim 1, wherein said auxiliary valve is urged by a spring and said orifices are cooperating orifices with one of said cooperating orifices being said calibrated orifice, whereby the flow of fluid is independent of the pressure of the fluid.

3. A steering arrangement as claimed in claim 1, wherein said auxiliary valve is formed between a fixed valve rigid with said valve seat and said sleeve is slidingly urged by a spring against said fixed valve and said orifices are cooperating orifices whereby the flow of fluid through said orifices is independent of the pressure of the fluid and depends on the angular position of said steering shaft.

4. A steering arrangement as claimed in claim 1, wherein a calibrated clearance is provided between said slide valve and said sleeve.

References Cited

UNITED STATES PATENTS 3,171,298   3/1965   Henry-Biaband _____ 74—495

MILTON KAUFMAN, *Primary Examiner.*

U.S. Cl. X.R.

180—79.2; 280—90, 94